US009309002B2

(12) United States Patent
Fellmann et al.

(10) Patent No.: US 9,309,002 B2
(45) Date of Patent: Apr. 12, 2016

(54) EVACUATION SLIDE READINESS INDICATING SYSTEMS

(71) Applicant: Air Cruisers Company, Wall Township, NJ (US)

(72) Inventors: Frank Fellmann, Jackson, NJ (US); Michael Kret, Bayville, NJ (US); Frank J. Brown, Bayville, NJ (US)

(73) Assignee: Air Cruisers Company, Wall Township, NJ (US)

( * ) Notice: Subject to any disclaimer, the term of this patent is extended or adjusted under 35 U.S.C. 154(b) by 0 days.

(21) Appl. No.: 14/504,625

(22) Filed: Oct. 2, 2014

(65) Prior Publication Data

US 2015/0097083 A1 Apr. 9, 2015

Related U.S. Application Data

(60) Provisional application No. 61/886,075, filed on Oct. 3, 2013.

(51) Int. Cl.

| | |
|---|---|
| ***B64D 25/14*** | (2006.01) |
| ***B64D 9/00*** | (2006.01) |
| ***B64D 45/00*** | (2006.01) |
| ***A62B 1/20*** | (2006.01) |

(52) U.S. Cl.
CPC . *B64D 25/14* (2013.01); *A62B 1/20* (2013.01); *B64D 9/00* (2013.01); *B64D 45/00* (2013.01)

(58) Field of Classification Search
CPC ........... B64D 45/00; B64D 9/00; B64D 25/14
USPC ............... 340/945; 182/18, 48, 49; 244/137.2
See application file for complete search history.

(56) References Cited

U.S. PATENT DOCUMENTS

| | | | | |
|---|---|---|---|---|
| 4,333,546 A | 6/1982 | Fisher | | |
| 5,209,323 A | 5/1993 | Hopkins | | |
| 6,443,259 B1 | 9/2002 | Oney et al. | | |
| 6,598,703 B1 | 7/2003 | Catalan | | |
| 2014/0291070 A1* | 10/2014 | White | B64D 25/14 | 182/49 |
| 2015/0033974 A1* | 2/2015 | Deshpande | B64D 25/14 | 102/530 |

FOREIGN PATENT DOCUMENTS

WO 2012084184 A1 6/2012

OTHER PUBLICATIONS

International Patent Application No. PCT/US2014/058747, International Search Report and Written Opinion dated Jan. 5, 2015.

* cited by examiner

*Primary Examiner* — George Bugg
*Assistant Examiner* — Sharmin Akhter
(74) *Attorney, Agent, or Firm* — Kilpatrick Townsend & Stockton LLP; Daen W. Russell

(57) ABSTRACT

Evacuation systems including slide readiness indicators are detailed. The indicators may include lights colored, preferably, red and green and powered using either pre-existing or dedicated electricity sources. Associated switching equipment defaults to illumination of a red light until a slide is satisfactorily inflated and deployed, at which time the red light is extinguished and a green light is illuminated to provide affirmative indication that evacuation via the slide may commence.

11 Claims, 7 Drawing Sheets

EVACUATION SLIDE READINESS INDICATING SYSTEMS

CROSS-REFERENCE TO RELATED APPLICATION

This application claims the benefit of U.S. Provisional Patent Application Ser. No. 61/886,075, filed Oct. 3, 2013, and entitled "Evacuation Slide Readiness Indicator Concept," the entire contents of which application are incorporated herein by this reference.

FIELD OF THE INVENTION

This application relates to systems for evacuating passenger vessels such as aircraft and more particularly, but not exclusively, to inflatable evacuation slides with indicators that the slides are inflated and ready for use.

BACKGROUND OF THE INVENTION

U.S. Pat. No. 4,333,546 to Fisher describes inflatable evacuation or escape slides intended principally for off-wing (or "over-wing") use. Because the wing may block view of the ground or other support surface from within the aircraft, passengers and crew may be unable to ascertain visually whether an off-wing evacuation slide has inflated sufficient for use. As noted in the Fisher patent:

> It is . . . important for the flight attendant to know whether or not the slide is properly extended without walking to the edge of the wing and looking down. This is important because the attendant must have this information without leaving the fuselage of the aircraft in order to direct the passengers to the escape slides which are operable.

See Fisher, col. 1, 11. 13-19. Accordingly, the escape slides of the Fisher patent include two additional indicator tubes designed to inflate upwardly into the line of sight of a flight attendant positioned at the corresponding fuselage access door. The indicator tubes further may include marking tape wrapped around their uppermost ends to enhance their visibility. See id. at col. 3, 11. 38-61. After presumed inflation of a slide, "[t]he attendant then can look out the access door of the fuselage and by observing the positions of the indicator tubes determine if the slide portion, which is not visible from the fuselage, is in condition for evacuating passengers." See id. at 11. 64-68 (numerals omitted).

U.S. Pat. No. 6,443,259 to Oley discloses a different mechanism for indicating readiness for use of an off-wing evacuation slide. Instead of using the two upwardly-inflatable tubes of the Fisher patent, slides of the Oley patent include > a conventional red, octagonal "stop" sign that is releasably mounted to the guard rail. The stop sign is removed (to indicate that it is safe to proceed) when the evacuation slide has properly deployed by means of a [lanyard] connected to [the] toe end of the evacuation slide. As the evacuation slide unfurls, the lanyard is paid out until, at the last stage, when the toe end unfurls the lanyard pulls the stop sign off the guard rail, so that it is no longer visible to a disembarking passenger.

See Oley, Abstract, 11. 9-17.

Such a stop sign of the Oley patent is made of fabric and removably attached to the guard rail by hook-and-loop fasteners. See id., col. 3, 11. 61-64. Full deployment of the corresponding slide "yank[s the sign] off its mountings" and pulls it into a sheath for concealment and stowage. See id., col. 4, 11. 25-33. Alternatively, the stop sign may be replaced by "a permanent sign which is concealed by a cover operated by a lanyard, or a conventional yellow 'police tape' stretching across the entrance [of the slide], which is removed by a lanyard." See id., col. 4, 11. 53-57. The contents of the Fisher and Oley patents are incorporated herein in their entireties by this reference.

As criticized in the Oley patent, the inflatable, upwardly-extending "barber poles" of the Fisher patent are disadvantageous at least because "they use valuable inflation gasses to effect their deployment." Additionally, they "are not intuitive," as "self-disembarking passengers will not know to look for the barber poles to determine the status of the evacuation slide and may attempt to exit the plane before the slide is properly deployed." See id., col. 1, 1. 59 through col. 2, 1. 6. Nor are the stop signs of the Oley patent wholly advantageous, however. Passengers and crew receive no affirmative indication of slide readiness, for example; mere absence of a "stop" sign might not be understood to mean "go," leading to possible confusion among evacuees as to whether evacuation is yet proper. Additionally, failure of the lanyard to overcome the mechanical strength of the hook-and-loop fasteners, tearing of the fabric of the stop sign, or lack of complete stowage of the stop sign in its sheath may result in continued visibility of some or all of the stop sign even though the corresponding slide is ready for use. This too could confuse passengers and crew, incorrectly inhibiting evacuation when it would be proper to do so.

SUMMARY OF THE INVENTION

The present invention provides alternatives to the readiness indicators of the Fisher and Oley patents. The indicators not only are intuitive, but also furnish affirmative information as to when evacuation is proper. No valuable inflation gas is needed for operation of the indicators of the present invention, nor is any "yanking" of fabric signs necessary to change states of the indicators from "stop" to "go." The present invention thus is designed to reduce, if not wholly avoid, evacuee confusion as to readiness of (particularly) off-wing inflatable evacuation slides for use without impeding inflation of the slides in any way. It further may be simple and reliable and use pre-existing electrical power.

Presently preferred versions of the invention may comprise colored lights indicating slide statuses. Although such lighting may be supplied in any suitable manner, at least some embodiments of the invention utilize red and green light-emitting diodes (LEDs) to furnish the colored lighting. Nearly universally understood by humans is that a red light is synonymous with a stop command, whereas a green light indicates the contrary (i.e. "go"). Depending on which light is illuminated at any given time, passengers and crew receive clear information—whether negative or affirmative—as to the readiness for use of the corresponding slide.

Moreover, some versions of the invention may place the lights on a background shaped like a conventional traffic signal. The signal-shaped background additionally may be of a color contrasting with red and green (e.g. yellow or orange). The effect is to clarify further the function and nature of the lighting as providing stop and go commands for slide usage.

Enhanced visibility of the indicator lighting may, if desired, be provided by mounting it on an outboard rail tube at the entrance to the ramp of the slide. This mounting position typically permits easy viewing of the lighting from the fuselage access door or an adjacent window, even in low-light conditions sometimes present in emergency evacuation situations.

Readiness indicator lighting of the invention may be powered by, for example, emergency power of the aircraft. Alternatively, batteries used for other aspects of slide lighting may power the indicator lighting of the present invention. No additional power thus is needed to operate the indicator lighting. However, if desired for any reason, the indicator lighting may have a dedicated power supply independent from those typically already present on-board an aircraft.

Certain versions of the invention may include a switching module mounted on a lower section of a slide. Upon commencement of slide deployment, electrical power may be supplied to the switching module, whose normal (default) state causes illumination of (only) the red LED. Normal slide inflation causes restraint links to separate sequentially to stage proper unfolding of the slide. As the slide continues to deploy normally, the restraint links continue to separate until a final link remains in the lower section of the slide. If the switching module is connected to or included as part of the final link, separation of the final link may cause the switching module to change state so as to extinguish the red LED and illuminate the green LED instead. Such change in illumination supplies an affirmative signal to passengers and crew that the slide has fully inflated. By contrast, if for any reason the final link does not separate—indicative of improper or incomplete deployment of the slide—the switching module will not change state and the red LED will remain illuminated.

Some switching modules may be designed to effect state change through removal of a pin. If the pin is attached to a lanyard in turn attached to a separable portion of the final link, separation of the final link will tension the lanyard and pull the pin from the switching module. As the pin is removed, the switching module changes from its default state (in which the red LED is illuminated) to a state in which the green LED is active and the red LED is inactive.

In some circumstances, it might be possible for a slide to deploy completely, hence activating the green LED, yet soon thereafter deflate sufficiently to be unusable. Some versions of the invention, therefore, also may include a pressure sensor which must register satisfactory pressure in the slide before the green LED may illuminate. If at any time slide pressure drops below a minimum acceptable value, the sensor prevents illumination of the green LED or, if the green LED is illuminated, causes a state change so that the red LED becomes active instead. The pressure sensor, if present, preferably is electrically powered, although other sensors of inflation pressure, including transducer-type sensors which may produce electrical signals, may be used instead.

It thus is an optional, non-exclusive object of the present invention to provide improved systems for evacuating persons from vessels or other objects.

It is also an optional, non-exclusive object of the present invention to provide evacuation systems in which indication of slide readiness is furnished.

It is another optional, non-exclusive object of the present invention to provide evacuation systems in which colored indicators of slide readiness are configured to be visible to passengers and crew within aircraft.

It is a further optional, non-exclusive object of the present invention to provide evacuation systems not requiring inflation gas or yanking of a fabric sign for purposes of indicating slide readiness.

It is, moreover, an optional, non-exclusive object of the present invention to provide evacuation systems in which red and green lights signal, alternatively, “stop” and “go” commands for slide usage.

It is an additional optional, non-exclusive object of the present invention to provide evacuation systems in which the signal lights may be positioned on an outboard rail tube at the entrance to a slide ramp and, optionally, with a background of contrasting color shaped as a traffic signal.

It is yet another optional, non-exclusive object of the present invention to provide evacuation systems in which indicator lights may be powered by pre-existing sources of electricity.

It is also an optional, non-exclusive object of the present invention to provide evacuation systems having switching modules whose states determine which one of a plurality of indicator lights present on a slide is to be illuminated.

It is a further optional, non-exclusive object of the present invention to provide evacuation systems in which a switching module is associated with a final restraint link of a slide such that separation of the final link causes the switching module to change states.

It is, moreover, an optional, non-exclusive object of the present invention to provide evacuation systems in which the switching module is configured to change states when a pin is pulled therefrom, as by a lanyard tensioned by separation of the final restraint link.

It is also an optional, non-exclusive object of the present invention to provide evacuation systems optionally including a sensor for determining that inflation pressure of a slide is (or remains) satisfactory for use.

Other objects, features, and advantages of the present invention will be apparent to those skilled in the art with reference to the remaining text and drawings of this application.

DETAILED DESCRIPTION

Figure 1:
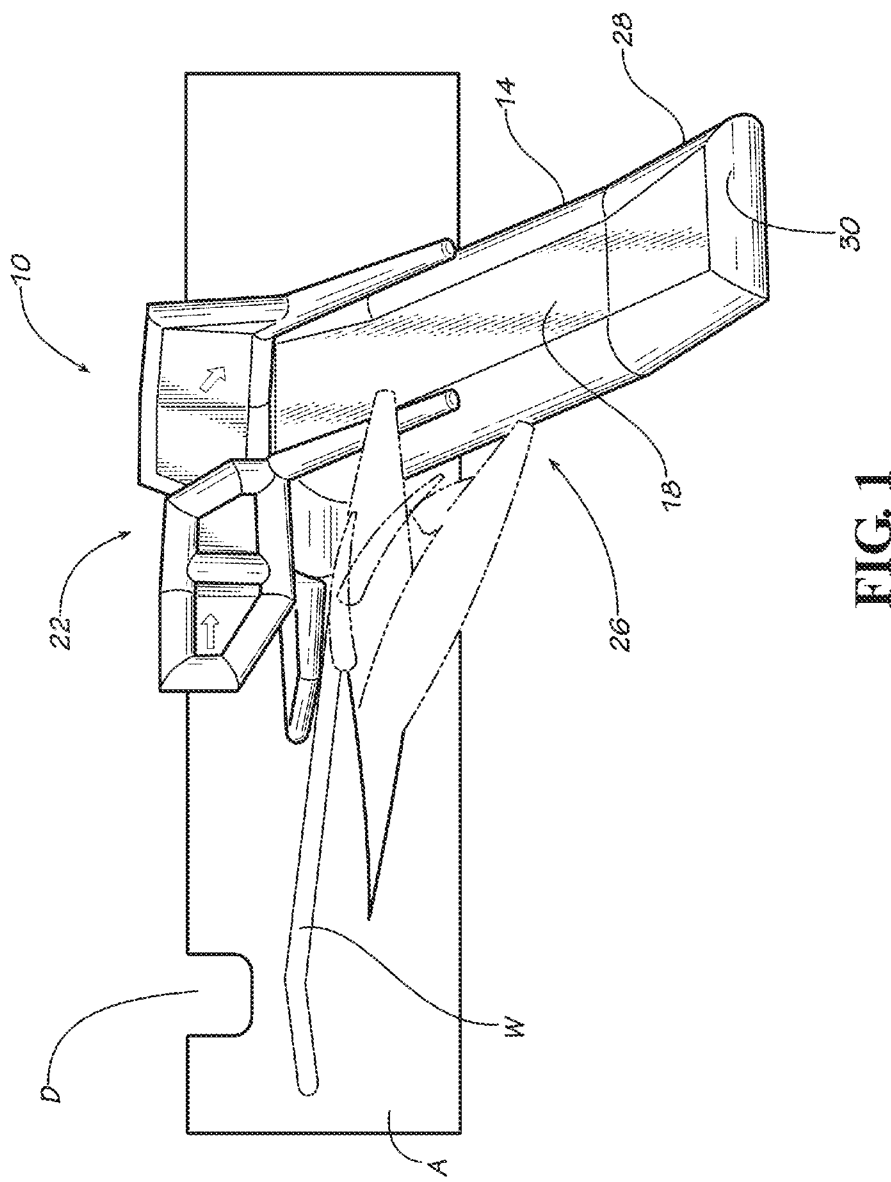
FIGS. 1-3 provide various, partly-schematic views of an exemplary inflatable off-wing slide as deployed for purposes of evacuating an aircraft.
Figure 2:
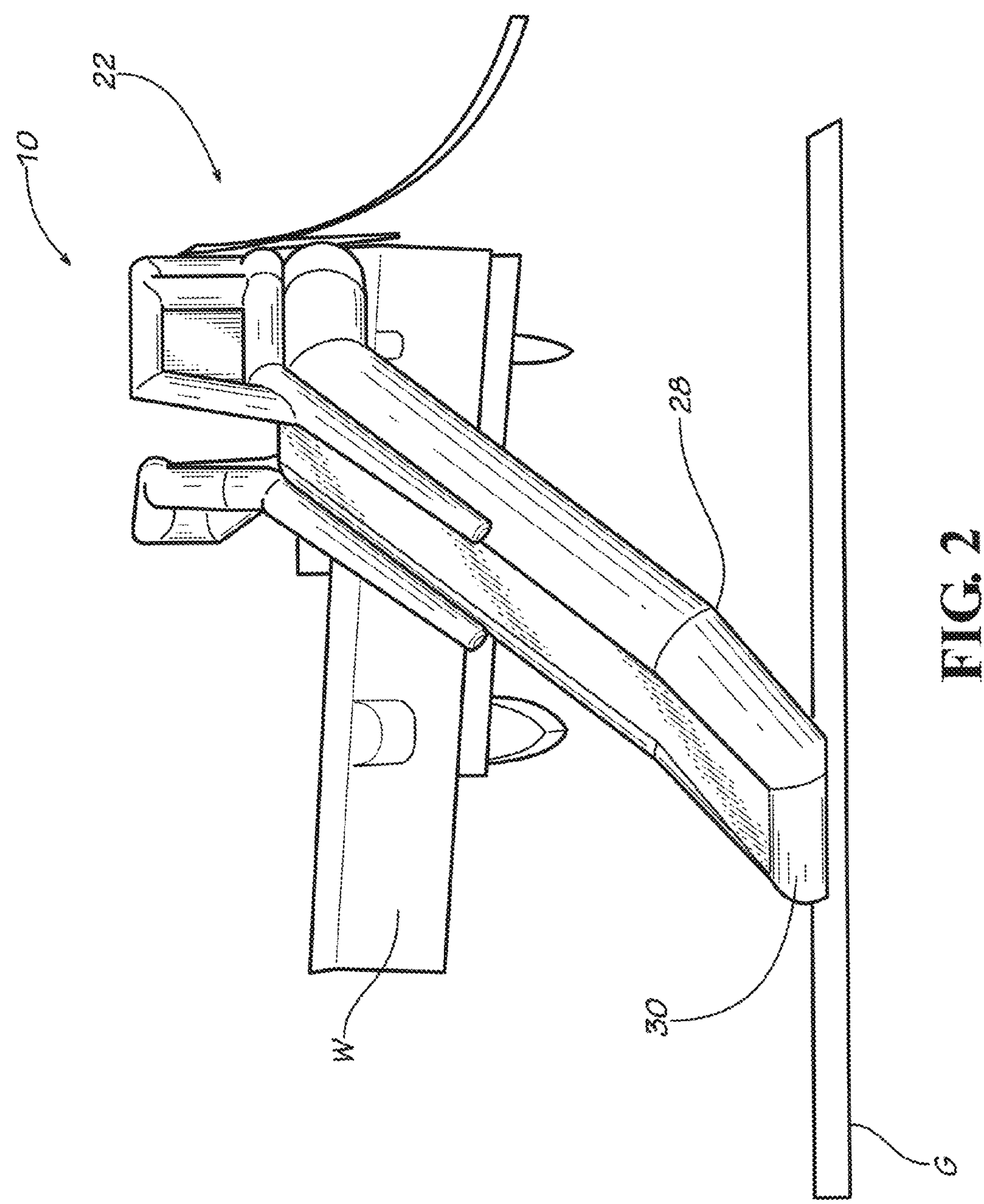
Figure 3:
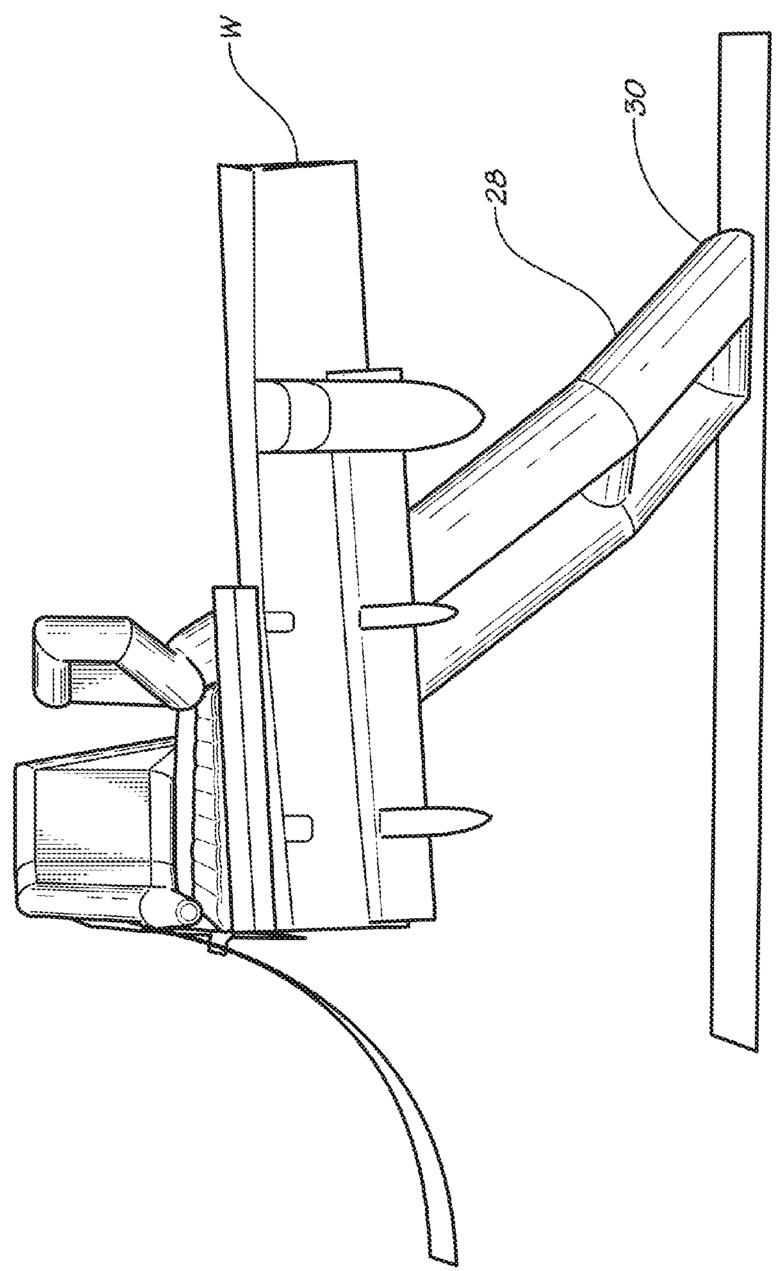

Depicted in FIGS. 1-3 is exemplary evacuation slide assembly 10. Slide assembly 10 is shown positioned in part on wing W of aircraft A and thus is commonly called an “off wing” (or “over wing”) assembly. Slide assembly 10 may comprise multiple inflatable tubes 14 and sliding surface 18 and be divided into a generally horizontal entrance section 22 and a ramped section 26 having lower section 28 terminating at toe end 30. Beneficially, when slide assembly 10 is deployed for evacuation of aircraft A, toe end 30 will be adjacent ground G or some other surface capable of supporting evacuees.

However, as illustrated especially in FIG. 3, view of lower section 28 (including toe end 30) from within aircraft A may be blocked by wing W. Thus, absent exiting the aircraft A via hatch door D and walking to entrance section 22, passengers and crew may be unable to ascertain whether, in particular, toe end 30 is inflated and positioned properly for use. In darkness or low-light conditions, furthermore, it may be impossible to assess the condition and positioning of lower section 28 even after exiting aircraft A onto entrance section 22.

Figure 4:
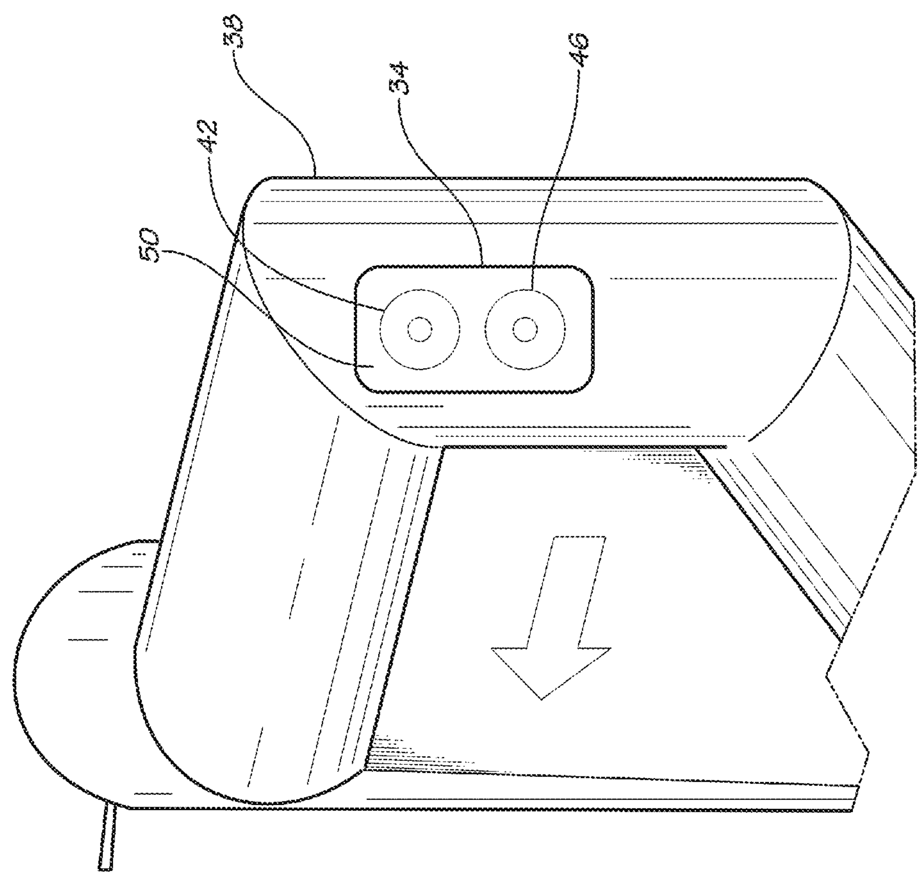
FIG. 4 illustrates an outboard rail tube of the slide of FIGS. 1-3 together with an exemplary readiness indicator of the present invention.
Figure 5:
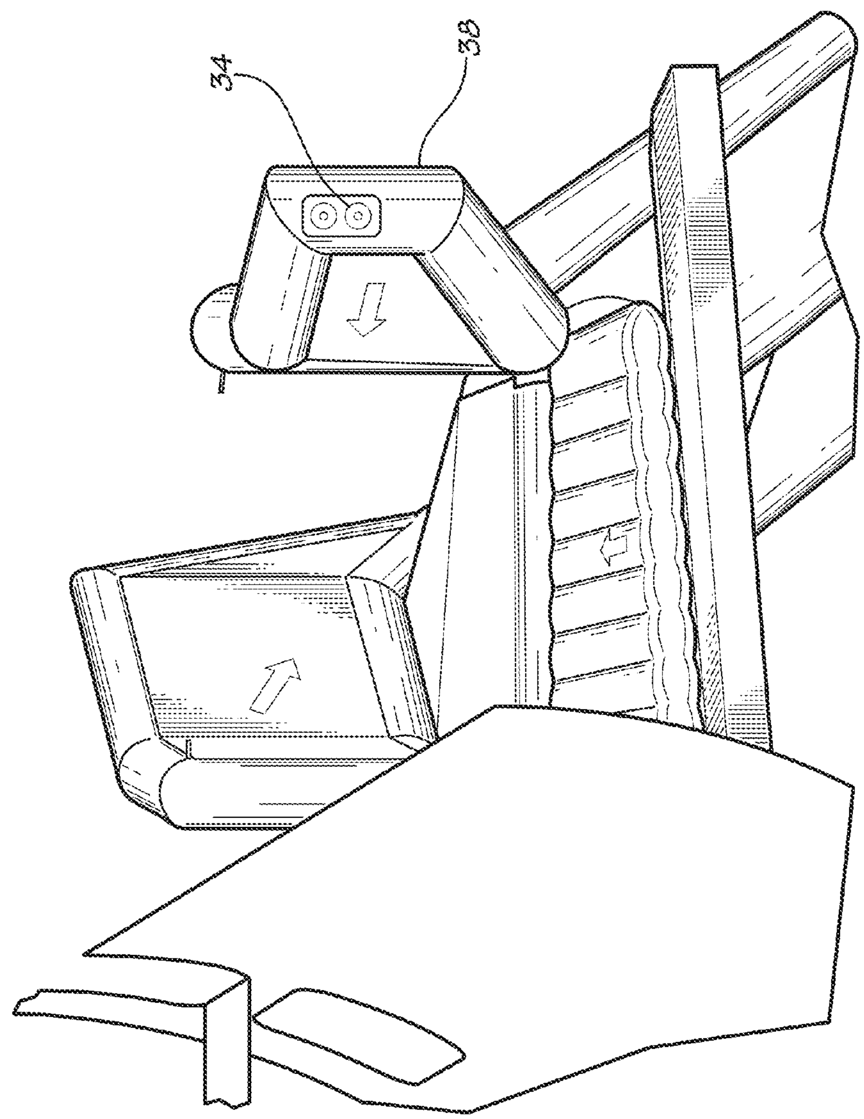
FIG. 5 is another view of portions of the slide and the readiness indicator of FIGS. 1-4.

FIGS. 4-5 show a solution to this issue in the form of readiness indicator 34. Indicator 34 preferably (although not necessarily) provides visible indication of the deployment status of slide assembly 10; visible indications further are preferably of high brightness to counteract external darkness or low-light conditions. Indicator 34 may be mounted, or otherwise attached or connected, to slide assembly 10 in any appropriate manner. As illustrated in FIG. 4, indicator 34 preferably is permanently attached to an outboard rail 38 of entrance section 22 so as to be readily visible from hatch door D or nearby windows of the fuselage of aircraft A.

At least some versions of indicator 34 include first and second components in the form of lights 42 and 46. One of these lights beneficially may be a red LED (42), whereas the other may be a green LED (46). The colors red and green may be chosen because of their near-universal signification of the commands "stop" and "go," respectively. Those skilled in the art will, though, recognize that indicator 34 need not provide visual indication or, if it does, that such visual indication need not necessarily be in the form of red and green lighting. Nevertheless, if present, lights 42 and 46 optionally may be backed by a contrasting colored structure or material 50 shaped in the form of a traffic signal, thereby reinforcing the "stop" and "go" command meanings of the red and green colors.

Lights 42 and 46 may be powered in any appropriate manner. Aircraft emergency power may be used, for example, as may power potentially available for lighting other aspects of slide assembly 10. Alternatively, one or more batteries or other power sources may be dedicated to powering lights 42 and 46. Switching module 54 (see FIGS. 6-7) may be employed to illuminate one or the other of lights 42 and 46—but preferably not both concurrently—depending on a condition of slide assembly 10. For example, switching module 54 may have a default state in which, upon deployment of slide assembly 10, power passes to illuminate red light 42. When slide assembly 10 is inflated sufficiently for use, switching module 54 may be caused to change state such that power passes to illuminate green light 46 instead. In this way, passengers and crew can be made to comprehend not to evacuate aircraft A when red light 42 is illuminated and to begin evacuating when the red light 42 is extinguished and green light 46 is illuminated.

Switching module 54, while directly or indirectly electrically connected to lights 42 and 46, beneficially may be mechanically connected to final restraint link 58 of slide assembly 10. As assembly 10 inflates for deployment, multiple restraint links may separate sequentially in controlled fashion so as properly to stage the unfolding of the assembly 10. By associating switching module 54 with final restraint link 58, allowing separation of that final restraint link 58 to effect a change of switching module 54 helps ensure such change occurs only when slide assembly 10 has inflated properly.

Figure 6:
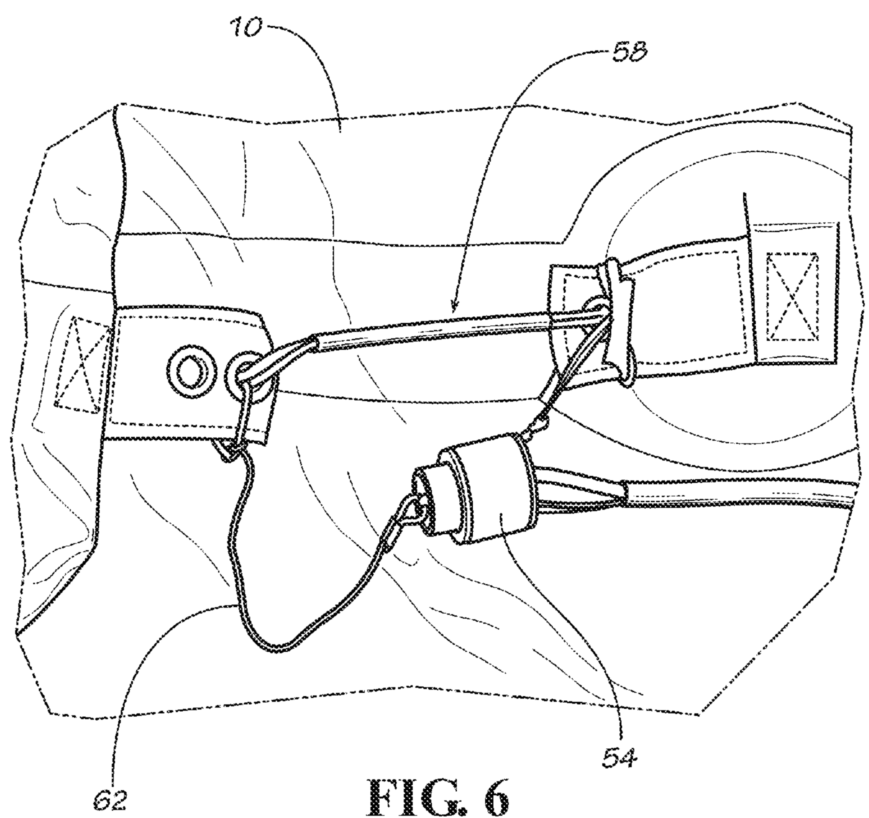
FIG. 6 provides an example of a switching module and final restraint link useful as parts of the slide and readiness indicator of FIGS. 1-5, with the final restraint link intact and the switching module in its normal (default) state.
Figure 7:
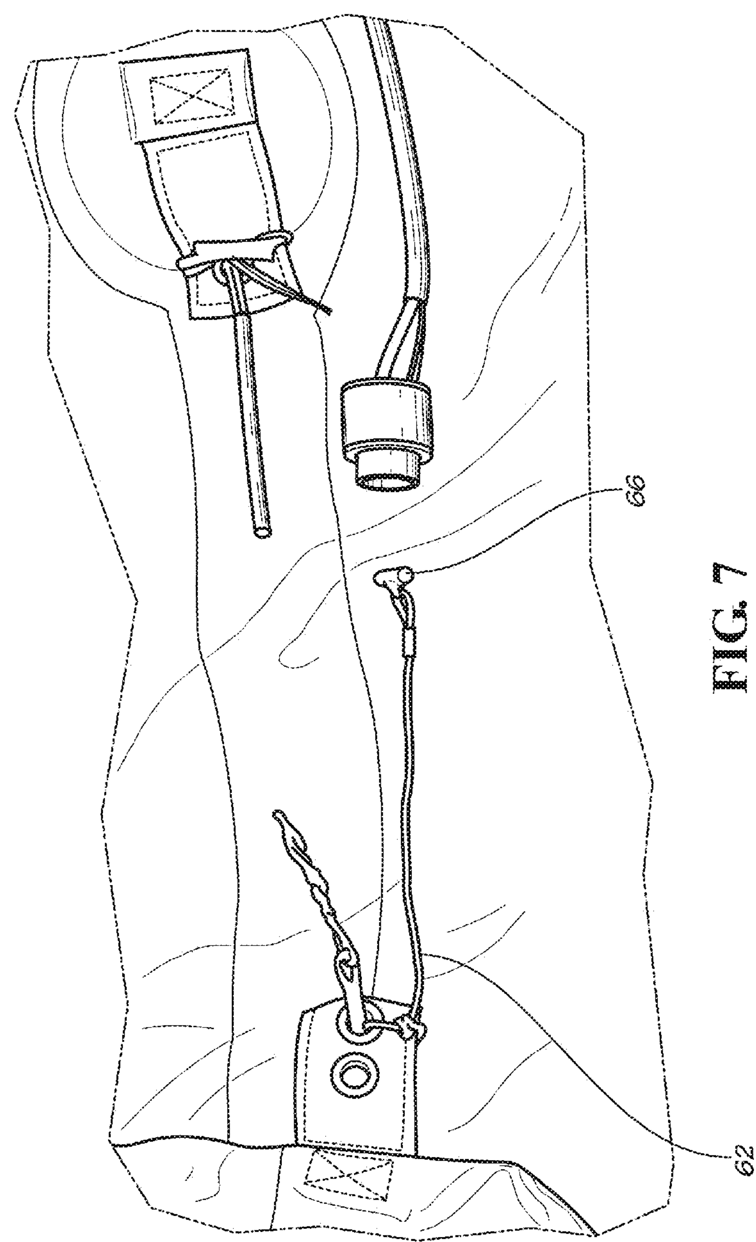
FIG. 7 illustrates the exemplary switching module and final restraint link of FIG. 6, with the final restraint link separated (i.e. not intact) thereby causing the switching module to change to a state differing from its normal state.

As shown in FIG. 6, final restraint link 58 is intact, and lanyard 62 is connected to pin 66 of switching module 54. As final restraint link 58 separates (FIG. 7), lanyard 66 is tensioned until the force pulls pin 66 from switching module 54. Switching module 54 is configured such that removal of pin 66 effects the state change (i.e. toggles the switch), removing power from red light 42 and supplying power to green light 46. By contrast, should slide assembly 10 not deploy properly such that final restraint link 58 does not separate, power never will be furnished to green light 46 but instead will be provided to red light 42 as long as power is available to switch module 54.

The foregoing is provided for purposes of illustrating, explaining, and describing embodiments of the present invention. Modifications and adaptations to these embodiments will be apparent to those skilled in the art and may be made without departing from the scope or spirit of the invention. As a non-limiting example of an acceptable adaptation, embodiments optionally may include a pressure sensor which must register satisfactory pressure in the slide to commence or maintain illumination of green light 46.

What is claimed is:

1. An inflatable assembly associated with an object containing at least one human, the inflatable assembly comprising:

a) an evacuation slide assembly configured to be inflated for deployment;

b) a readiness indicator comprising (i) first and second components, activation of the first component indicating the evacuation slide assembly is not deployed in a manner suitable for a human to evacuate the object and activation of the second component indicating the evacuation slide assembly is deployed in a manner suitable for a human to evacuate the object, and (ii) a separable restraint link; and c) a switching module directly or indirectly electrically communicating with the first and second components and directly or indirectly mechanically connected to the restraint link so that separation of the restraint link effects a state change of the switching module so as to supply power to one or the other of the first and second components.

2. An inflatable assembly according to claim 1 in which each of the first and second components is a light.

3. An inflatable assembly according to claim 2 in which light emitted from the first component is of a color different than light emitted from the second component.

4. An inflatable assembly according to claim 3 in which the light emitted from the first component is red and the light emitted from the second component is green.

5. An inflatable assembly according to claim 1 in which the switching module is configured so as to supply power to no more than one of the first and second components at any given time.

6. An inflatable assembly according to claim 1 further comprising a pressure sensor directly or indirectly electrically communicating with the switching module.

7. An inflatable assembly associated with an object containing at least one human, the inflatable assembly comprising:

a) an evacuation slide assembly configured to be inflated for deployment;

b) a readiness indicator comprising first and second components, activation of the first component indicating the evacuation slide assembly is not deployed in a manner suitable for a human to evacuate the object and activation of the second component indicating the evacuation slide assembly is deployed in a manner suitable for a human to evacuate the object; and c) a switching module (i) directly or indirectly electrically communicating with the first and second components, (ii) configured so as to supply power to no more than one of the first and second components at any given time, (iii) normally supplying power to the first component, and (iv) including a pin, removal of which causes cessation of power supply to the first component and commencement of power supply to the second component.

8. An inflatable assembly according to claim 7 in which the evacuation slide assembly comprises at least one restraint link, separation of which effects removal of the pin from the switching module.

9. An inflatable assembly associated with an object containing at least one human, the inflatable assembly comprising:

a) an evacuation slide assembly configured to be inflated for deployment;

b) a readiness indicator comprising first and second components, activation of [he first component indicating the evacuation slide assembly is not deployed in a manner suitable for a human to evacuate the object and activation of the second component indicating the evacuation slide assembly is deployed in a manner suitable for a human to evacuate the object; and c) an outboard rail tube; and in which the readiness indicator provides a traffic signal, with activation of the first component signifying evacuation should not occur and activation of the second component signifying evacuation should occur.

10. An inflatable assembly according to claim 9 in which the readiness indicator is permanently attached to the outboard rail tube.

11. A passenger aircraft comprising:

a) a wing;

b) an evacuation slide assembly positioned at or adjacent the wing and configured to be inflated for deployment;

c) a readiness indicator comprising red and green lights and a separable restraint link, activation of the red light indicating the evacuation slide assembly is not deployed in a manner suitable for a passenger to evacuate the aircraft and activation of the green light indicating the evacuation slide assembly is deployed in a manner suitable for a passenger to evacuate the aircraft; and d) a switching module directly or indirectly electrically communicating with the red and green lights and directly or indirectly mechanically connected to the restraint link so that separation of the restraint link effects a state change of the switching module so as to supply power to one or the other of the red and green lights.

* * * * *